United States Patent [19]

Hatanaka et al.

[11] Patent Number: 5,241,256
[45] Date of Patent: Aug. 31, 1993

[54] METHOD AND APPARATUS FOR CONTROLLING THE SUPPLY OF POWER TO AN INDUCTION MOTOR TO MAINTAIN HIGH EFFICIENCY UNDER VARYING LOAD CONDITIONS

[75] Inventors: Takefumi Hatanaka; Naruto Kuwahara, both of Tokyo, Japan

[73] Assignee: Arex Electronics Corporation, Tokyo, Japan

[21] Appl. No.: 920,352

[22] Filed: Jul. 27, 1992

[30] Foreign Application Priority Data

Feb. 10, 1992 [JP] Japan ................................ 4-67864

[51] Int. Cl.$^5$ ............................................ H02P 7/00
[52] U.S. Cl. ...................................... 318/801; 318/729
[58] Field of Search ............................ 318/799–812, 318/438, 729

[56] References Cited

U.S. PATENT DOCUMENTS

| | | | |
|---|---|---|---|
| 4,266,177 | 5/1981 | Nola | 318/810 |
| 4,355,274 | 10/1982 | Bourbeau | 318/812 |
| 4,356,440 | 10/1982 | Curtiss et al. | 323/210 |
| 4,704,570 | 11/1987 | Hopkins | 318/812 |

Primary Examiner—Jonathan Wysocki
Attorney, Agent, or Firm—Jordan and Hamburg

[57] ABSTRACT

An energy-saving induction motor control apparatus maintains the operation of a motor at an optimum power factor irrespective of changes in motor load, by generating a power factor compensation value which is varied in accordance with the motor supply voltage. The motor supply voltage is controlled such as to reduce any difference between the optimum power factor value and a measured power factor value, thereby ensuring that stable operation with minimum energy consumption are achieved over a wide range of motor load values.

4 Claims, 10 Drawing Sheets

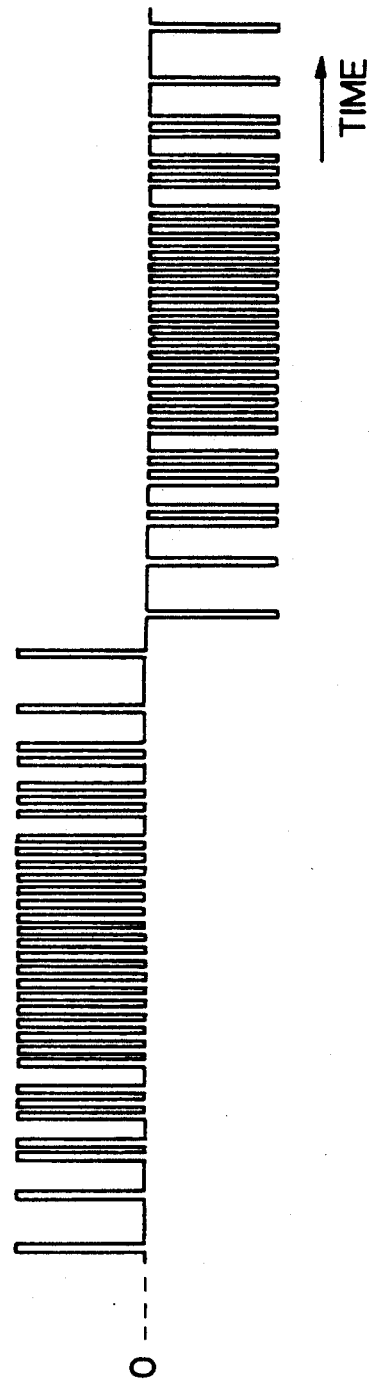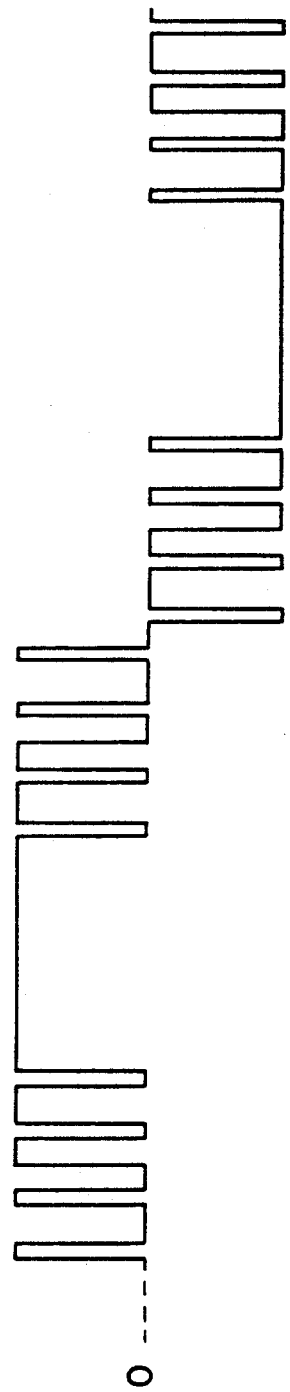

METHOD AND APPARATUS FOR CONTROLLING THE SUPPLY OF POWER TO AN INDUCTION MOTOR TO MAINTAIN HIGH EFFICIENCY UNDER VARYING LOAD CONDITIONS

BACKGROUND OF THE INVENTION

1. Field of the Invention

The present invention relates to an apparatus and method for controlling the supply of power to an induction motor, and in particular to an induction motor control apparatus and control method whereby an induction motor can be operated with a high degree of efficiency under varying conditions of motor load.

2. Description of the Related Art

The present invention is related to a pending U.S. patent application, Ser. No. 07/776,117 with filing date Oct. 15, 1991, by the assignees of the present invention.

In controlling an induction motor to operate with high efficiency over a wide range of values of motor load, the basic objective is to apply an appropriate value of drive voltage to the motor for the load that is being currently imposed. If for example an excessively high value of supply voltage (in relation to the required level of motor torque) is applied while the motor is driving a very light load, then excessive drive current will flow, so that the operating efficiency is low. If however the supply voltage is insufficiently high in such a case, then a sudden increase in the motor load may result in stalling of the motor, or to unstable operation. Various schemes have been proposed in the prior art for controlling the supply of power to an induction motor such as to maximize the operating efficiency. However in general such schemes are deficient with regard to preventing stalling or instability during low-load operation of an induction motor, or result in excessive power consumption under medium or low-load conditions. The basic problem which is to be solved by such prior art systems and by the present invention (considering the case of operating an induction motor at a single drive frequency) is to ensure that the supply voltage of the motor under full-load conditions will provide sufficient torque to balance the applied load, while also ensuring that an excessively high supply voltage (with correspondingly excessive power consumption) will not be applied when the motor load becomes very light, but at the same time ensuring that the supply voltage applied in that light-load condition will not be so low that stalling or instability of motor operation will result.

In addition, considering the case of variable-frequency drive of the induction motor, the appropriate supply voltage for any particular value of motor load will vary in accordance with the drive frequency, and the control system must therefore also modify the motor supply voltage in accordance with frequency.

One induction motor control method which has been proposed in U.S. Pat. No. 4,052,648 for achieving such objectives is based upon detecting the power factor phase angle (or the power factor itself, which is the cosine of the angle expressed as a value in the range 0% to 100%) at which the motor is operating, and controlling the supply voltage of the motor such as to maintain the power factor at a certain preset value. If the motor is operating under a high load, with an appropriate value of supply voltage being applied, the power factor might for example be 80%. If now the load is increased, the amount of lag between the motor current and voltage will increase, so that the power factor will decrease. Conversely, a decrease in the motor load will result in an increase in the power factor. Thus, changes in the motor load can be detected by changes in the power factor, and the supply voltage can be controlled in responses to such detected changes in load, such as to hold the power factor at the preset value. However in practice with such a method, if the preset power factor is selected to be optimum for operation of the motor at full load, the voltage that is supplied when the motor is operating under light load will not be optimum for that value of load (i.e. optimum with regard to minimum power consumption consistent with prevention of stalling or instability). Similarly, when the motor is operated at an intermediate level of load, the supply voltage will not be appropriate for that load value.

Another proposal for an induction motor control system is described in U.S. Pat. No. 5,010,287. That system is designed for application to variable-frequency drive of an induction motor, to provide variable-speed operation. However considering operation with that system at any one particular drive frequency, the operation is similar to that described above, in that the power factor phase angle of the motor is controlled to be held at a preset value. Specifically, the actual power factor phase angle is detected and compared with a preset value of power factor phase angle (determined by pulses produced from a reference pulse generator), and the supply voltage is increased or decreased in accordance with the comparison result such as to bring the detected power factor phase angle to the preset value. Thus, the motor will only be operated at an optimum power factor when one specific load (referred to as the "standard load") is being imposed.

With that control system, respectively different values of preset power factor phase angle are selected in accordance with different values of drive frequency. However it can be understood from considering the case of operation at any specific value of drive frequency, that the same disadvantages arise as for the first-mentioned prior art U.S. patent, i.e. high efficiency and stability of operation cannot be ensured for operation over a wide range of varying motor loads, since the power factor that is established for the motor operation will only be optimum when the "standard load" is imposed.

The above point will be described referring to FIG. 1, in which the graph B represents the optimum values of power factor of an induction motor in the range from no-load to full-load (100%). It is assumed that the optimum power factor for full-load operation is 80%. With the prior art induction motor control systems described above, the power factor is controlled to be held at a value such as 80% (i.e. the broken-line characteristic A). However considering operation with a load that is 50% of full load, the optimum power factor might actually be 64%, and under the no-load condition the system will still attempt to maintain the power factor at 80%. Thus, such prior art systems which are based on power factor detection cannot provide optimum efficiency of operation over a wide range of values of imposed motor load.

SUMMARY OF THE INVENTION

It is an objective of the present invention to overcome the disadvantages of the prior art set out above, by providing an energy-saving induction motor control apparatus and method of control whereby the motor will be continuously operated at an optimum value of power factor over a wide range of varying values of motor load, to thereby ensure maximum efficiency of operation over that range of load value.

To achieve that objective, the power factor of the induction motor is detected and compared with a value which represents an optimum power factor for the load that is currently imposed on the motor, with the result of that comparison being applied to control the level of supply voltage of the induction motor to thereby reduce the supply voltage level in accordance with a reduction of motor load, and with the optimum power factor value being modified in accordance with the amount of change of supply voltage. As a result, the optimum power factor is continuously adjusted in accordance with changes in motor load, so that the motor operation can always be held at the optimum power factor for the load that is currently imposed.

BRIEF DESCRIPTION OF THE DRAWINGS

FIGS. 4(a) and 4(b) illustrate waveforms of drive voltage applied to a switching element of a DC-AC inverter in the circuit of FIGS. 3(a) and 3(b);

DESCRIPTION OF PREFERRED EMBODIMENTS

Figure 1:
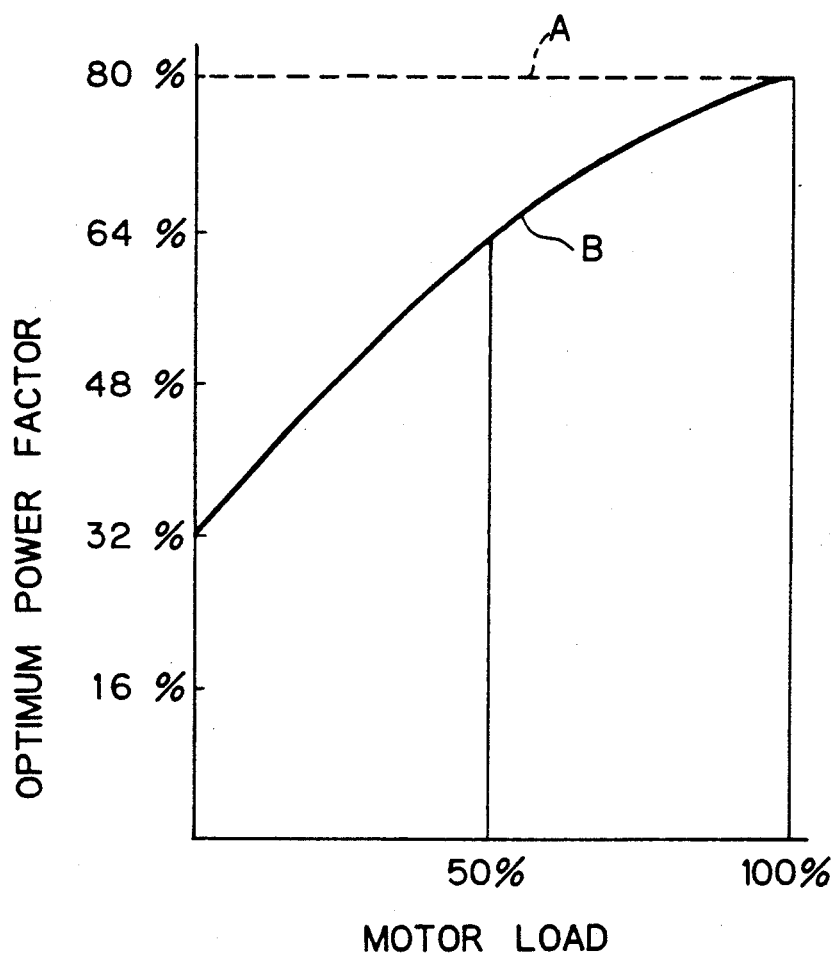
FIG. 1 is a graph showing a relationship between optimum values of power factor and induction motor load.

The basic principles of an induction motor control apparatus according to the present invention will be described, considering first the case of operation at one specific drive frequency. The power factor at which the motor is operating is continuously monitored and compared with a preset value of power factor, which is the optimum power factor for some particular value of imposed load at that specific drive frequency. The supply voltage applied to the motor is controlled in accordance with the results obtained from that comparison, so that the supply voltage will vary in accordance with the imposed load on the motor. However as the supply voltage thus varies, the aforementioned preset value of power factor is modified by being multiplied by a compensation value, whose value is in the range from 0 to 1 and is determined in accordance with the level of motor supply voltage at that time. The relationship between the power factor compensation value and motor supply voltage might be for example as shown by curve C1 of FIG. 2, when the motor drive frequency is 50 Hz. As shown, the power factor compensation value decreases in accordance with decreasing values of motor supply voltage, i.e. in accordance with decreasing levels of motor load. Thus as the motor load decreases, the power factor at which the motor operation is held will be correspondingly reduced. In that way, it becomes possible to hold the operating power factor at respective optimum values as the motor load varies, i.e. in accordance with the optimum power factor curve B shown in FIG. 1.

Figure 2:
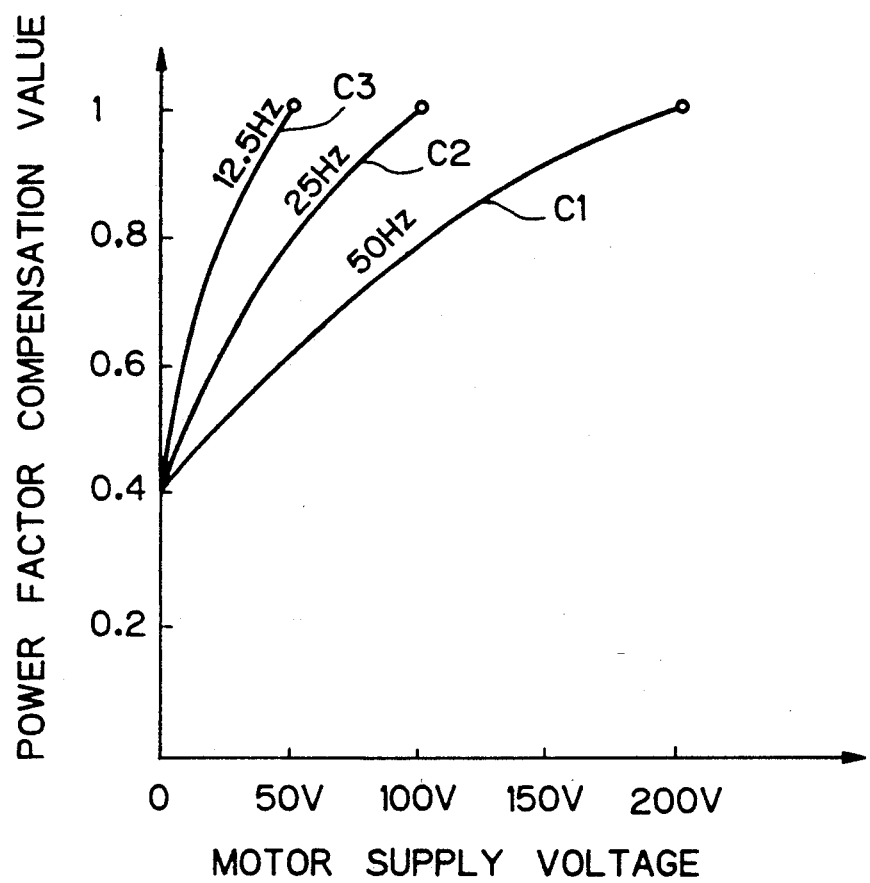
FIG. 2 shows respective relationships between optimum values of power factor and induction motor supply voltage, for operation at three different values of drive frequency.

The characteristic of optimum power factor versus motor supply voltage will vary in accordance with drive frequency. Thus it is necessary to use correspondingly different characteristics between the power factor compensation value and motor supply voltage as illustrated in FIG. 2, in which C2 and C3 are respective characteristics which are applicable to drive frequencies of 25 Hz and 12 Hz, respectively. The range of motor supply voltage values is varied in accordance with the drive frequency. Thus for example in FIG. 2, the maximum voltage value is 200 V when the drive frequency is 50 Hz, whereas the maximum value of motor supply voltage is 100 V when the drive frequency is set as 25 Hz, and 50 V when the drive frequency is set as 12.5 Hz.

Figure 3A:
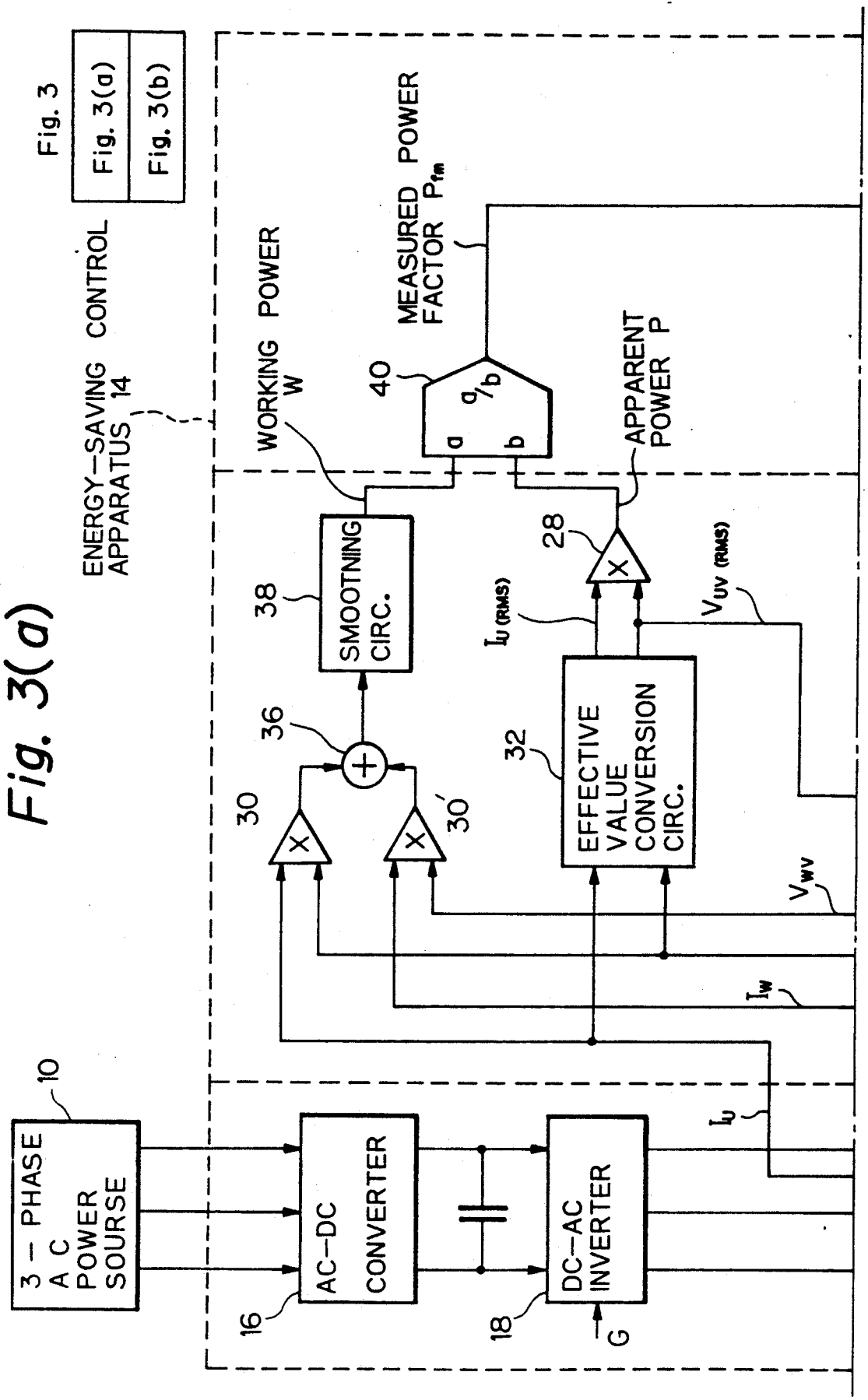
FIGS. 3(a) and 3(b), combined in the manner shown in FIG. 3, illustrate a block circuit diagram of a first embodiment of an induction motor control apparatus according to the present invention.
Figure 3B:
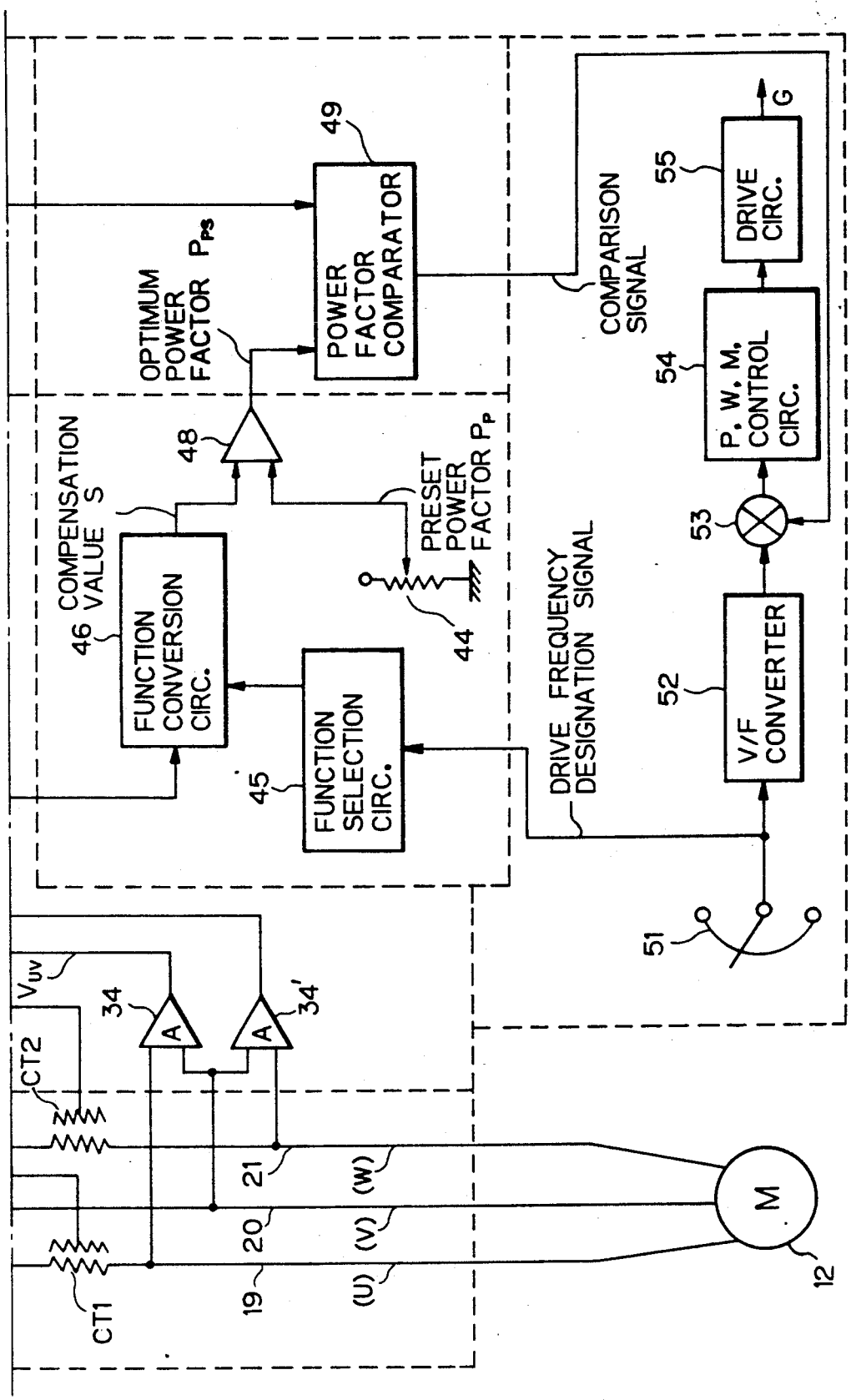

FIG. 3 is a block circuit diagram of a first embodiment of an energy-saving induction motor control apparatus according to the present invention. The portion 14 within the outermost broken-line outline constitutes the induction motor control apparatus. A 3-phase AC power source 10 supplies power to an AC-DC converter 16, to obtain a DC power voltage which is supplied to a DC-to-AC inverter 18. The inverter 18 is based on three switching elements, which receive respective ones of a set of 3-phase switching element control signals, collectively designated as G. These switching element control signals determine the frequency and amplitude of the 3-phase AC supply voltages produced from the inverter 18 on lines 19, 20, 21, which are supplied to an induction motor 12. These respective 3 output phases will be referred to as the U, V and W phases. For simplicity, the voltage between any two of these phases will be referred to as the motor supply voltage. The values of motor drive currents which flow in the U and W phases, designated as $I_U$ and $I_W$ respectively, are detected by current transformers CT1, CT2 respectively, and are thereby supplied to respective inputs of of multipliers 30, 30', while $I_U$ is also supplied to one input of an effective value conversion circuit 32 (i.e. $I_U$ and $I_W$ are respective AC voltage signals which vary in accordance with the U and W phase AC supply currents). The U-V phase voltage $V_{UV}$ is detected by an adder 34, and the W-V phase voltage value $V_{WV}$ is detected by an adder 34'. The alternating current signal $V_{UV}$ is supplied to the other input of the multiplier 30 and to a second input of the effective value conversion circuit 32, while $V_{WV}$ is applied to the other input of the multiplier 30'. Thus by summing the output values produced from the multipliers 30, 30' in the adder 36, and smoothing the result by the smoothing circuit 38, an output signal is obtained whose level represents the working power W of the motor 12.

The effective value conversion circuit 32 converts $I_U$ to the corresponding RMS current value I (RMS) similarly converts $V_{UV}$ to the RMS voltage value $V_{UV}$(RMS). These are multiplied in the multiplier 28 to obtain the value of apparent power P supplied to the motor 12. The ratio of the working power W to the apparent power P is then obtained by a divider 40, as a voltage whose value represents the measured power factor $P_{fm}$, which is supplied to one input of a power factor comparator 49.

The RMS voltage value $V_{UV(RMS)}$ is supplied to a function conversion circuit 46, which serves to generate the aforementioned power factor compensation value which varies in accordance with the motor supply voltage level. A device 51 such as a potentiometer or switch is adjustable for producing a drive frequency designation signal (e.g. a voltage signal) which designates the motor drive frequency. That signal is supplied to a function selection circuit 45 which selects, in accordance with the designated drive frequency, one out of a plurality of predetermined conversion functions and controls the function conversion circuit 46 to execute conversion of $V_{UV(RMS)}$ to a corresponding power factor compensation value in accordance with that selected conversion function. If three of the conversion functions correspond for example to the curves C1, C2 and C3 of FIG. 2, then these functions will be respectively selected when the designated drive frequency takes the values 50 Hz, 25 Hz, and 12.5 Hz.

A device 44 such as a potentiometer or switch is adjustable for producing a voltate signal whose value represents a preset power factor value $P_f$. As described hereinabove, the preset power factor $P_f$ is an optimum value of power factor at some particular level of imposed load on the motor (e.g. full load). That preset power factor value is applied to one input of a multiplier 48, with the power factor compensation value value S being supplied to the other input, so that a voltage representing an optimum power factor value $P_{fs}$ is produced from the multiplier $P_{fs}$ as the product of the preset power factor and the compensation value. The optimum power factor value $P_{fs}$ is supplied to the other input of the power factor comparator 49. The power factor comparator 49 thereby produces a comparison signal which varies in level between fixed maximum and minimum values in accordance with an amount of difference between the measured power factor $P_{fm}$ and the optimum power factor $P_{fs}$.

The drive frequency designation signal is also supplied to a V/F converter 52. As described above, the range of motor supply voltage values is varied in accordance with the drive frequency. The V/F converter 52 produces an output signal which varies periodically in amplitude at the designated motor drive frequency and whose variation amplitude is determined in accordance with the designated drive frequency value. That variation amplitude determines the maximum value of a range of motor supply voltage values which are controlled in accordance with the comparison signal value from the comparator 49. The output from the V/F converter 52 is multiplied by the comparison signal in a multiplier 53, to thereby obtain an output which varies periodically at the designated drive frequency and is modified in variation amplitude by the level of the comparison signal. That output signal from the multiplier 53 is then converted to three fixed-amplitude trains of bipolar pulses, each having a duty ratio that varies periodically at the designated drive frequency, and with the periodic variations respectively differing in phase by 60° between the three pulse trains. These are then amplified in a drive circuit 55, to be supplied as the switching element drive signals G for the three switching elements of the inverter 18, to convert the DC power voltage supplied thereto to the 3-phase power supply voltages for the lines 19, 20, 21.

Diagram (a) of FIG. 4 illustrates one period of duty ratio variation of one of the aforementioned bipolar pulse trains, which as shown, varies sinusoidally in duty ratio. Diagram (a) represents the case in which the output amplitude from the multiplier 53 is small in value, as a result of the comparison signal level being small, so that the average duty ratio of the bipolar pulses is small, and hence a low value of supply voltage will be produced from the inverter 18. Diagram (b) illustrates the waveform for the case in which a high value of motor supply voltage is produced.

As described above, the variation amplitude of the output signal from the V/F converter 52 determines the maximum value of motor supply voltage, and is determined in accordance with the designated value of drive frequency. Thus for example referring to FIG. 2, if the designated drive frequency is 25 Hz, the variation amplitude of the output from the V/F converter 52 is determined such that the resultant motor drive voltage will be 100 V when the comparison signal is at its maximum value (e.g. a value of 1).

It can be understood from the above that in this embodiment, a main power supply circuit section is based on the AC-DC converter 16 and inverter 18, a power value calculation section is based on the multipliers 30, 30', adder 36 and smoothing circuit 38, the adders 34, 34', the effective value conversion circuit 32 and the multiplier 28, that the divider 40 constitutes a power factor detection section, the function selection circuit 45, function conversion circuit 46, multiplier 48, and preset power factor producing device 44 constitute an optimum power factor generating section, and the drive frequency designation signal generating device 51a, the V/F converter 52, the multiplier 52a, the P.W.M. control circuit 54, and the drive circuit 56 constitute a switching element drive signal generating section, whose output signals are controlled based on the output signal from the power factor comparator 49.

With the above embodiment, the difference between the measured power factor $P_{fm}$ at which the motor is operating and the optimum power factor $P_{fs}$ is derived by the power factor comparator 49, and is applied to control the level of motor supply voltage. If for example the relationship between optimum values of power factor and motor supply voltage is as shown in FIG. 3, and the motor is operating at full load with the optimum power factor of 80%, a reduction in the motor load will result in an increase of the measured power factor $P_{fm}$. The resultant change in the comparison signal produced from the power factor comparator 49 will produce a reduction of the motor supply voltage. As the supply voltage (represented by the value of $V_{UV(RMS)}$ supplied to the function conversion circuit 46) is reduced, there will be a corresponding reduction of the power factor compensation value, so that the optimum power factor $P_{fs}$ will be reduced. As a result, the motor operation will stabilize at a condition in which a new value of supply voltage is being applied to the motor, with that new supply voltage being such as to make the measured power factor $P_{fm}$ equal to the new value of optimum power factor $P_{fs}$. Thus, for the case of the optimum power factor/motor load relationship of FIG. 1, a reduction of the motor load from 100% to 50% of full load will result in the operating power factor of the motor being changed from 80% to 64%.

Conversely if the motor load increases, causing an increased degree of lag between the motor current and motor supply voltage (i.e. a decrease in the measured power factor $P_{fm}$), the motor supply voltage will be automatically increased until the measured power factor P$_{fm}$ reaches the optimum value for the new level of load.

It can thus be understood that the above embodiment executes negative feedback control to automatically vary the operating power factor of the motor 12 such as to maintain that power factor at an optimum value with respect to the load that is being imposed on the motor. In that way it becomes possible to ensure that a minimum amount of power will be consumed by the motor when running under a condition of light load or no-load, while at the same time ensuring that the motor will operate stably under such a low-load condition. It has been found that the invention can thereby provide a substantially greater degree of energy saving in the operation of an induction motor than has been possible with any prior art type of induction motor control apparatus.

Figure 5:
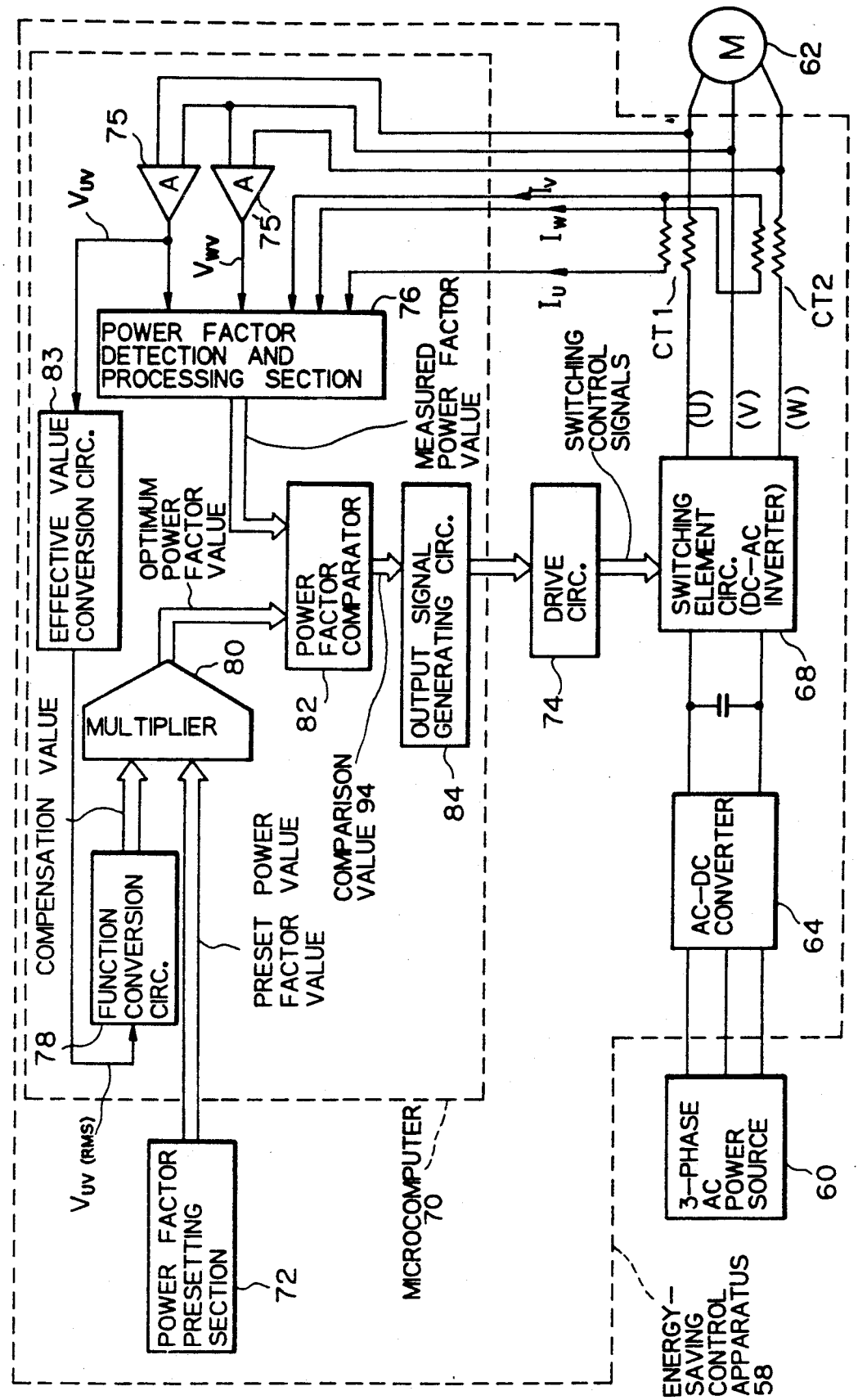
FIG. 5 is a block circuit diagram of a second embodiment of an induction motor control apparatus according to the present invention.
Figure 6A:
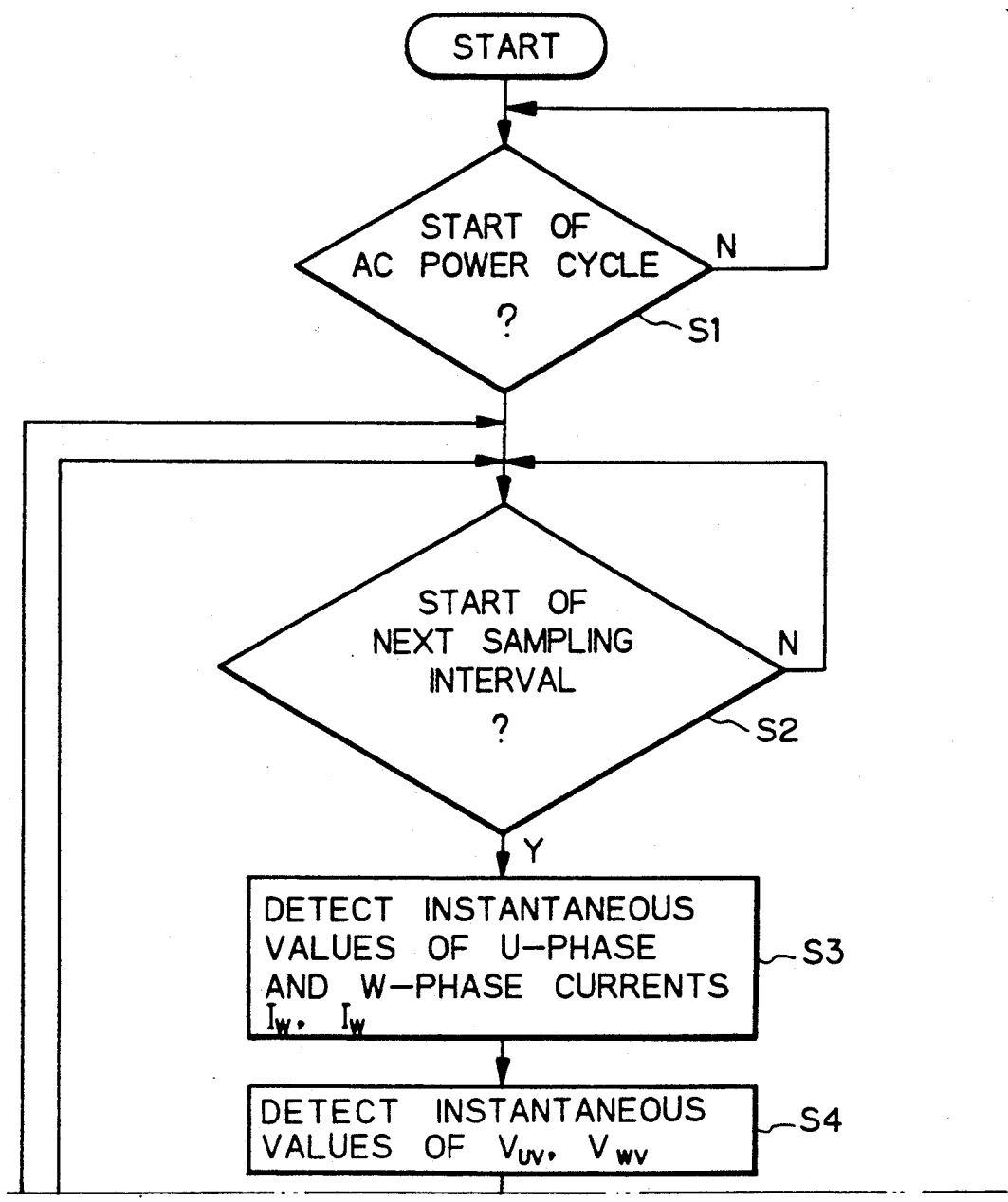
FIGS. 6(a), 6(b), 6(c) and 6(d), combined in the manner illustrated in FIG. 6, illustrate a flow diagram to illustrate the operation of a microcomputer in the embodiment of FIG. 5.
Figure 6B:
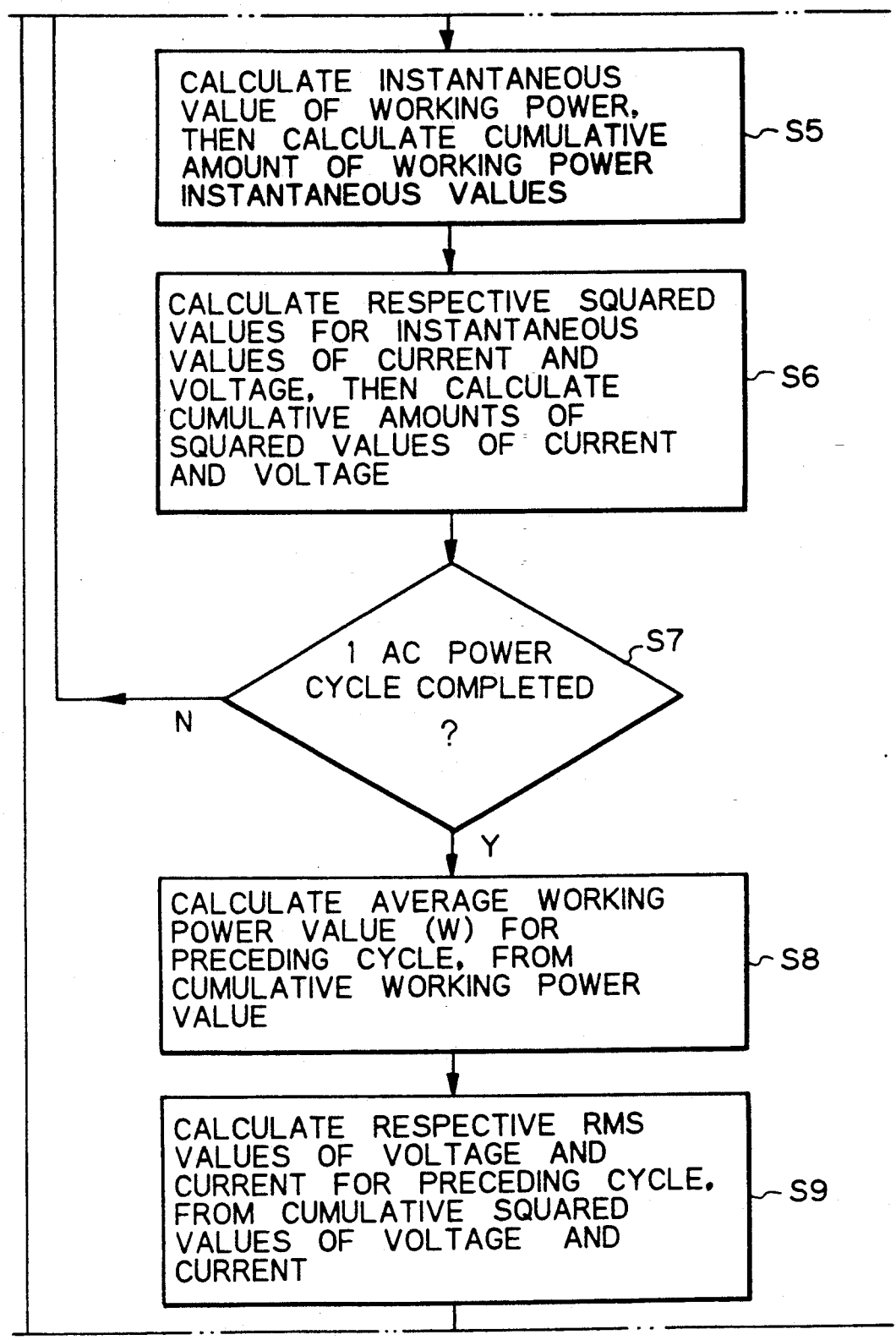
Figure 6C:
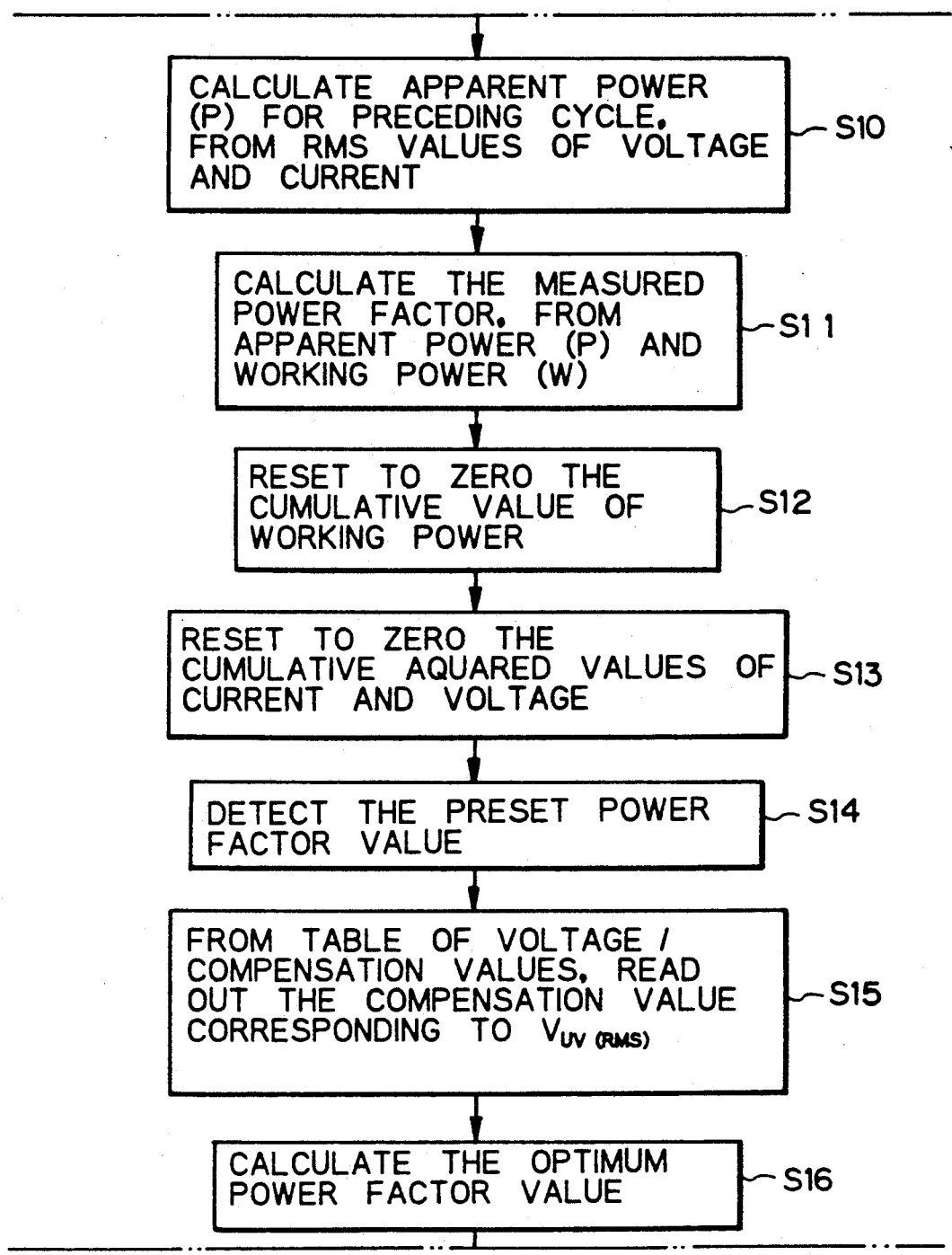
Figure 6D:
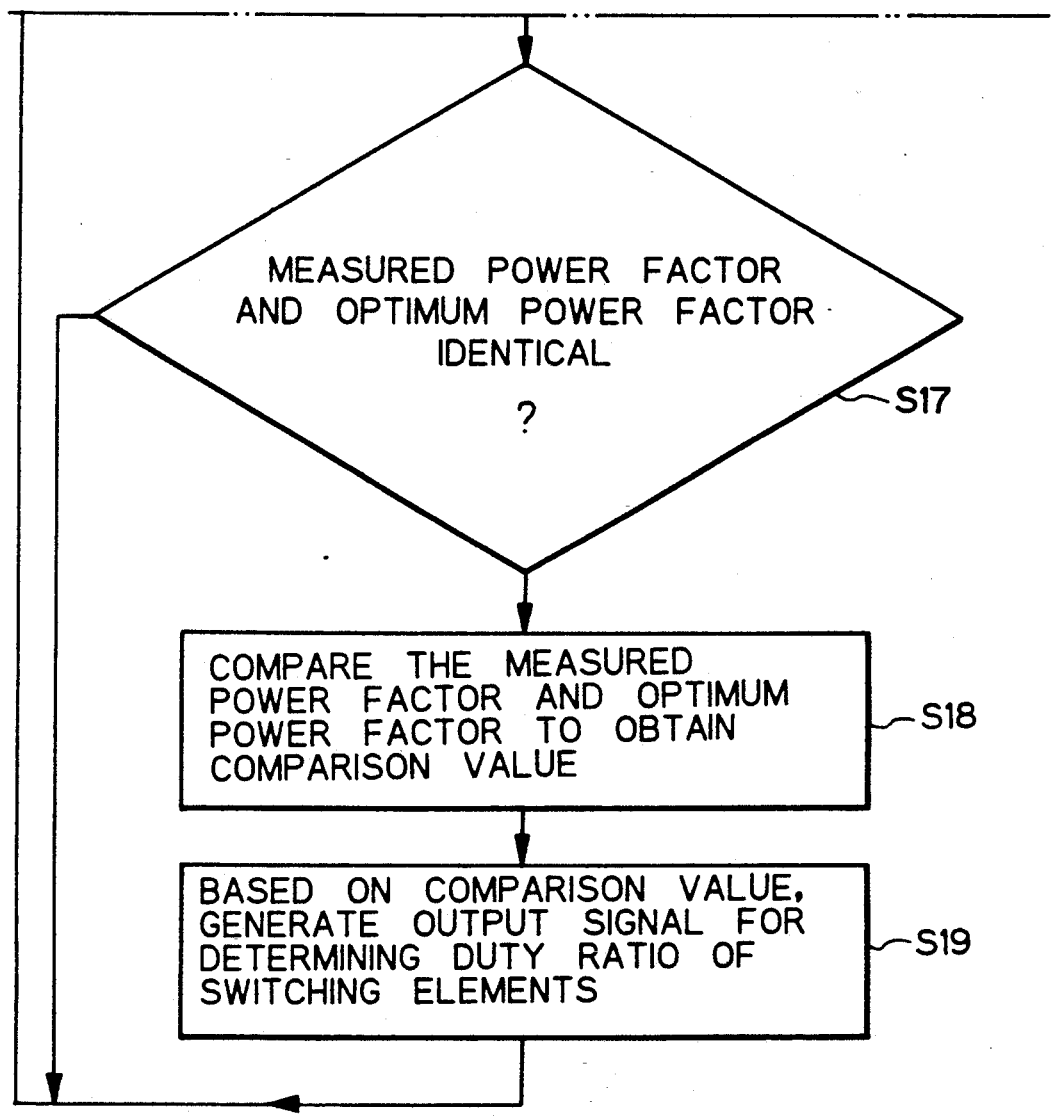

The first embodiment described above can be implemented by using analog signal processing for most or all of the functions. FIG. 5 is a block circuit diagram of a second embodiment of an energy-saving induction motor control apparatus according to the present invention. The basic principles of operation of this embodiment are identical to those of the first embodiment described above, and the only differences are that the operation of the second embodiment is based on digital signal processing by a microcomputer (i e. a microprocessor combined with ROM and/or RAM memory), and that a more accurate method of deriving the measured power factor is used in the second embodiment. In FIG. 5, the induction motor control apparatus itself is the portion 58 shown within the outer broken-line outline. The induction motor control apparatus is based on a microcomputer 70, which receives the motor supply current values I$_U$, I$_W$ and I$_V$ from current transformers CT1, CT2 as shown. For ease of understanding, various functions which are actually implemented by the operation of the microcomputer 70 through execution of a program (as described hereinafter) are indicated in FIG. 5 as respective circuits, sections, adders etc. The microcomputer 70 as illustrated includes adders 75, 75' for deriving the supply voltage values V$_{UV}$, V$_{WV}$. These voltage values are supplied, together with the current values I$_U$, I$_W$ and I$_V$ to a power factor detection and processing section 76, which operates on these current and voltage values as described hereinafter to derive the measured power factor at which the motor is operating.

The microcomputer 70 also receives as input a preset power factor value, produced from a power factor presetting section 72, which is adjustable for establishing a desired value of preset power factor. The preset power factor value is inputted to a multiplier 80, to be multiplied by a compensation value which is produced from a function conversion circuit 78. As described hereinabove for the first embodiment, the function conversion circuit 78 operates on the V$_{UV(RMS)}$ in accordance with a specific conversion function to obtain the compensation value. In this embodiment, the function conversion circuit 78 actually consists of a plurality of sets of tables of values, stored in memory, with each table corresponding to a specific value of motor drive frequency. Respective conversion functions are thereby established for different values of drive frequency, as described hereinabove for the first embodiment. Conversion to derive a power factor compensation value is executed by reading out from one of these tables a compensation value in accordance with the value of V$_{UV(RMS)}$. For ease of understanding, the V$_{UV(RMS)}$ is shown as being derived by a conversion circuit 83, however in practice it is necessary to derive the V$_{UV(RMS)}$ in the process of deriving the measured power factor value, as described hereinafter. The difference between the measured power factor and optimum power factor values is derived by a power factor comparator 82, as a comparison value which is supplied to an output signal generating circuit 84. The output signal generating circuit 84 responds by producing an output signal value for controlling the motor supply voltage, which is applied to a drive circuit 74. The drive circuit 74 generates a set of 3-phase switching control signals, as described for the first embodiment, which vary sinusoidally in duty ratio at a specific motor drive frequency. These drive signals are supplied to three respective switching elements in a DC-AC inverter 68, to convert the DC voltage produced from an AC-DC converter 64 to a set of 3-phase supply voltages to be applied to an induction motor 62.

In this embodiment the motor drive frequency is determined by a frequency designating section (omitted from the drawing for simplicity of description), which also determines (in accordance with the drive frequency that is specified) the function that is selected to be used by the function conversion circuit 78 to convert V$_{UV}$ to a corresponding power factor compensation value, by selecting one of the aforementioned plurality of tables of compensation values.

FIG. 6 is a general flow diagram for illustrating the basic sequence of operations which are repetitively executed by the microcomputer 70 in accordance with a program, for computing successive values of measured power factor at which the induction motor is currently operating and for generating an output signal from the output signal generating circuit 84 for controlling the motor supply voltage. At the start, i.e. when power is applied to the system, the operation waits (step SI) until the start of an AC power cycle, e.g. the start of a cycle of the voltage V$_{UV}$ between the U and V phases of the output voltages from the inverter 68. Within each AC cycle, a plurality of sampling operations are executed at the respective starting points of successive sampling intervals. In the first execution of step S2 the operation waits until the timing of the first sampling interval of the AC cycle, and when that timing is reached, the respective values of the U-phase and W-phase currents I$_U$ and I$_W$ at that instant are detected and held in a register (step S3). In the next step (S4) the instantaneous values of the voltages V$_{UV}$ and V$_{WV}$ are similarly detected and held in a register. In step S5 the instantaneous value of working power, which will be designated as p, is obtained by multiplying together these voltage and current values, i.e. is obtained as:

$$p = I_U \cdot V_{UV} + I_W \cdot V_{WV}$$

That instantaneous power value p is then stored in a register, and in step S6 the respective squares of the values of instantaneous voltage and current obtained in steps S3, S4 are computed, and stored in registers. After this first execution of steps S3 to S6, operation returns to step S2 and then steps S3 to S6 are repeated. However in this repetition, as each instantaneous value of current, voltage squared current, squared voltage and power is derived, it is added to the corresponding value that was derived in the preceding repetition, to obtain respective cumulative instantaneous values.

When it is detected in step S7 that the end of that AC cycle is completed, the value of working power for that cycle is calculated as the average of the instantaneous power values, by using the final cumulative working power value and the number of samples (step S8). In then succeeding step S9, the respective RMS values of voltage and current $V_{UV(RMS)}$, $V_{WV(RMS)}$, $I_{U(RMS)}$, $I_{V(RMS)}$ are calculated from the respective final cumulative squared values of current and voltage obtained for the preceding AC cycle. In step S10, the apparent power P for the preceding cycle are calculated from the RMS current and voltage values. Then in step S11, the measured power factor is calculated as the ratio of apparent power P to working power W.

Next, in preparation for the next repetitions of steps S3 to S6, the cumulative values obtained for the preceding AC cycle are each reset to zero (steps S12, S13).

In step S14 the preset power factor value is detected, then in step S15 the power factor compensation value corresponding to $V_{UV(RMS)}$ is read out from the aforementioned table, and that is then applied to the preset power factor to obtain the optimum power factor value. If it is now found in step S17 that the measured power factor and optimum power factor values are identical, then operation returns to step S2, to begin a first repetition of steps S3 to S6 at the start of the first sampling interval of the next AC cycle. If the preset power factor and optimum power factor values are mutually different, then these are compared to obtain a comparison value (step S18), which is then used in producing an output signal which will result in a change in the motor supply voltage, as described hereinabove. Operation then returns to step S2.

In the above description it is assumed that all of the operations of steps S3 to S19 can be successively completed between the start of the last sampling interval of one AC power cycle and the start of the first sampling interval of the succeeding cycle. In that case, a new value of measured power factor will be derived for each of the successive AC power cycles. Derivation of the measured power factor as described for the second embodiment, based on periodically sampling to obtain instantaneous values of current and voltage, has the advantage of providing very high accuracy, irrespective of waveform distortion of the AC supply voltages and currents of the induction motor which are provided from the DC-AC inverter that is controlled in accordance with the measured power factor.

From the above description of the embodiments it can be understood that the present invention provides an energy-saving induction motor control apparatus whereby the power factor at which an induction motor operates is continuously maintained at an optimum value in accordance with the load that is imposed on the motor, by controlling the motor supply voltage in accordance with the results of a comparison between the measured power factor of the motor and a power factor which is optimum with respect to the motor load. As a result, stable operation together with minimum power consumption is achieved when the motor is operating under a low-load condition. It has been found that the invention can provide very substantial savings in energy consumption, when applied to an induction motor which must drive varying degrees of load.

In general, for any specific value of motor load, the optimum power factor for the case of a relatively high value of drive frequency of an induction motor will be different from the optimum power factor when the drive frequency is made very low. Thus although it has been assumed in the above description that the same value of preset power factor (i.e. optimum power factor for full-load operation) is used for different values of drive frequency, it would be equally possible to provide plurality of different values of preset power factor, to be selected in accordance with the designated value of drive frequency, in the same way that one of a plurality of different power factor conversion functions is selected in accordance with drive frequency, as described hereinabove.

What is claimed is:

1. An induction motor control apparatus for controlling supply of power to an induction motor from a voltage power source which has a source of a DC voltage, comprising:
   DC-to-AC inverter means for converting said DC voltage to an AC supply voltage which is variable in level and has a frequency selectable from a group of a plurality of frequencies, to be supplied to said induction motor;
   means for deriving a detected value of level at which said AC supply voltage is currently being supplied to said induction motor;
   means for providing a present power factor value (Pp);
   function conversion means for providing a plurality of functions of power factor compensation values with respect to values of said AC supply voltage level, said functions corresponding to respective frequencies of said plurality of frequencies, for selecting one of said functions in accordance with a frequency at which said AC supply voltage is currently being produced, and for deriving a power factor compensation value from said selected one of the functions, in accordance with said detected level of the AC supply voltage;
   means for generating an optimum power factor value ($P_{PS}$) as the product of said preset power factor value and said power factor compensation value;
   means for deriving a value of measured power factor ($P_{fm}$) at at which said induction motor is operating;
   means for detecting a difference value between said measured power factor and optimum power factor values; and
   means for controlling said inverter means in accordance with said difference value, to adjust said AC supply voltage level to reduce said amount of difference.

2. An inverter device for an induction motor, having a converter to convert an AC source voltage to a DC voltage and inverter means for converting said DC voltage to an AC supply voltage which is variable in level and has a frequency selectable from a group of a plurality of frequencies, to be supplied to said induction motor, comprising:
   means for providing a drive frequency designation signal which specifies a designated frequency of said AC supply voltage;
   voltage-to-frequency conversion means for producing an output signal varying in amplitude in dependence on said drive frequency designation signal;
   pulse width modulation control circuit means for producing a pulse width modulation control signal to drive said inverter means in response to said output signal of the voltage-to-frequency conversion means;

means for deriving a detected value of level at which said AC supply voltage is currently being supplied to said induction motor;

means for providing a preset power factor value;

function conversion means for providing a plurality of functions of power factor compensation values with respect to values of level of said AC supply voltage, said functions corresponding to respectively different frequencies of said plurality of frequencies, for selecting one of said functions in accordance with said designated frequency, and for deriving a power factor compensation value from said selected one of the functions in accordance with said detected value of AC supply voltage level;

means for generating an optimum power factor value as the product of said present power factor value and said power factor compensation value; and means for detecting a difference value between said measured power factor and said optimum power factor value;

said pulse width modulation control circuit means being responsive to said difference value for adjusting said AC supply voltage level to operate said induction motor at said optimum power factor value.

3. A method for driving an induction motor with an AC supply voltage, comprising the steps of:

(a) converting an AC voltage to a DC voltage;

(b) inverting said DC voltage with inverter means to obtain said AC supply voltage, with said AC supply voltage being variable in level and having a frequency selectable from a group of a plurality of frequencies;

(c) providing a plurality of functions for use in deriving power factor values, said functions respectively corresponding to different ones of said plurality of frequencies and each of said functions expressible as a curve extending from a minimum value to a maximum value of power factor, selecting one of said functions in accordance with a current value of said frequency of the AC supply voltage, and deriving an optimum power factor based on said selected function;

(d) detecting an operating power factor at which said induction motor is currently operating;

(e) comparing said optimum power factor with said operating power factor, to obtain a difference value therebetween; and (f) applying a pulse width modulation control signal to said inverter means, while modifying said pulse width modulation control signal in accordance with said difference value to adjust said AC supply voltage level to reduce said difference value.

4. The driving method of claim 3 comprising successively varying values of optimum power factor derived from the function from a minimum to a maximum value in accordance with successive values of said AC supply voltage level for each of said functions.

* * * * *